(12) United States Patent
Harvey

(10) Patent No.: US 9,434,402 B1
(45) Date of Patent: Sep. 6, 2016

(54) SAUCER SLED WITH A SEAT

(71) Applicant: Thomas Harvey, Show Low, AZ (US)

(72) Inventor: Thomas Harvey, Show Low, AZ (US)

(*) Notice: Subject to any disclaimer, the term of this patent is extended or adjusted under 35 U.S.C. 154(b) by 0 days.

(21) Appl. No.: 14/867,471

(22) Filed: Sep. 28, 2015

(51) Int. Cl.
*B62B 15/00* (2006.01)
*B62B 17/06* (2006.01)
*B62B 17/00* (2006.01)

(52) U.S. Cl.
CPC ............. *B62B 17/063* (2013.01); *B62B 15/00* (2013.01); *B62B 17/061* (2013.01)

(58) Field of Classification Search
CPC ....... B62B 13/00; B62B 13/02; B62B 13/06; B62B 13/08; B62B 15/00; B62B 15/07; B62B 17/00; B62B 17/06; B62B 17/063
USPC .............................. 280/15–19, 18.1, 21.1, 27
See application file for complete search history.

(56) References Cited

U.S. PATENT DOCUMENTS

| | | | | |
|---|---|---|---|---|
| 2,219,905 A * | 10/1940 | Prickman | ............. | B62B 13/005 280/18.1 |
| 2,450,285 A * | 9/1948 | Lidberg | ................. | B62B 15/00 280/18 |
| 3,374,000 A * | 3/1968 | Wetzel | ..................... | B60D 1/00 280/16 |
| 3,512,195 A * | 5/1970 | Porsche | ................. | B62B 13/06 280/18 |
| 4,262,919 A * | 4/1981 | Krent | ................... | B62B 13/005 280/16 |
| D281,679 S * | 12/1985 | Marquesen | ..................... | D12/11 |
| 4,669,992 A * | 6/1987 | Morris | ..................... | B63B 35/81 114/363 |
| 5,222,748 A * | 6/1993 | Johnson | ..................... | B62B 3/02 280/19.1 |
| D380,705 S | 7/1997 | Fenton et al. | | |
| D402,594 S * | 12/1998 | Fireman | ........................ | D12/11 |
| 6,257,599 B1 * | 7/2001 | Johnson | ................. | B62B 15/00 280/28 |
| D462,299 S * | 9/2002 | Fireman | ................. | B62B 15/00 D12/11 |
| D483,296 S * | 12/2003 | Peterson | ........................ | D12/11 |
| D512,941 S * | 12/2005 | Maier | ............................. | D12/11 |
| 9,211,896 B1 * | 12/2015 | Berghash | ................. | B62B 3/02 |
| 2005/0263998 A1 * | 12/2005 | Edwards | ................. | B62B 15/00 280/845 |
| 2008/0224429 A1 * | 9/2008 | Watson | ................... | B62B 15/00 280/19 |
| 2012/0299256 A1 * | 11/2012 | Bromley | ................. | B62B 13/06 280/18 |
| 2014/0021689 A1 * | 1/2014 | Marlow | ................. | B62B 15/00 280/18 |

* cited by examiner

*Primary Examiner* — Paul N Dickson
*Assistant Examiner* — Travis Coolman
(74) *Attorney, Agent, or Firm* — Crossley and Stevenson Intellectual Property Law

(57) ABSTRACT

A saucer sled with a seat including a concave saucer-shaped sled having an interior surface, an exterior surface, and a continuous rounded outer rim. A trapezoidal base is medially disposed on the interior surface of the sled proximal a back area. A chair has a seat portion, a seatback portion, a right armrest, and a left armrest. A bottom surface of the seat portion of the chair is disposed atop inside the base. A pair of elongated apertures includes a right aperture and a left aperture. Each of the right aperture and the left aperture is disposed through a right area of the sled and a left area of the sled, respectively, along the outer rim.

5 Claims, 5 Drawing Sheets

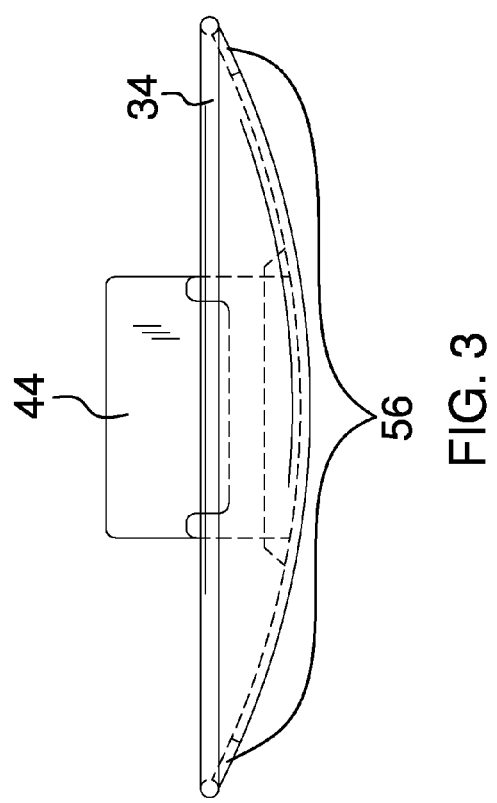
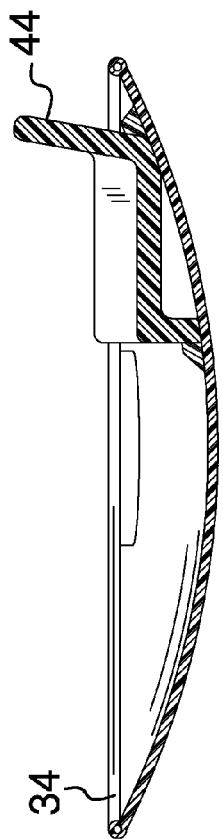

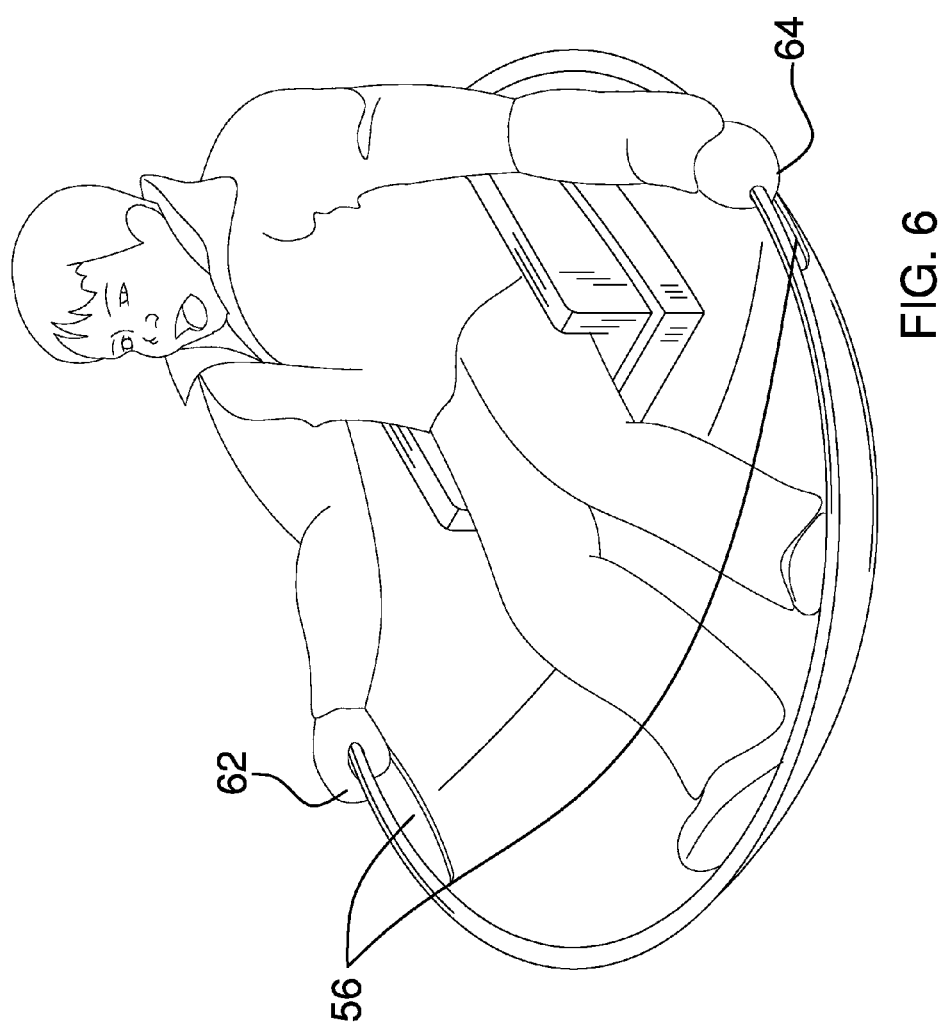

SAUCER SLED WITH A SEAT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of sleds are known in the prior art. However, what has been needed is a saucer sled with a seat including a concave saucer-shaped sled, a trapezoidal base medially disposed on an interior surface of the sled proximal a back area of the sled, and a chair disposed atop the base. What has been further needed is a pair of elongated elliptical apertures including a right aperture and a left aperture. Each of the right aperture and the left aperture is disposed through a right area of the sled and a left area of the sled, respectively, along an outer rim of the sled. Lastly, what has been needed is for each of the right aperture and the left aperture to be configured to removably fit each of a user's right hand fingers and a user's left hand fingers, respectively, such that the user can hold on to the outer rim of the sled while seated in the chair. The stability of both the seat disposed on the base and the pair of apertures configured to act as handles on the sled provide enhanced handling and safety features for the user of the sled.

FIELD OF THE INVENTION

The present invention relates to sleds, and more particularly, to a saucer sled with a seat.

SUMMARY OF THE INVENTION

The general purpose of the present saucer sled with a seat, described subsequently in greater detail, is to provide a sled which has many novel features that result in a saucer sled with a seat which is not anticipated, rendered obvious, suggested, or even implied by prior art, either alone or in combination thereof.

To accomplish this, the present saucer sled with a seat includes a concave saucer-shaped sled having an interior surface, an exterior surface, a front area, a back area, a right area, a left area, and a continuous rounded outer rim. A trapezoidal base is medially disposed on the interior surface of the sled proximal the back area. The base has a right side, a left side, and a rear surface. A chair has a seat portion, a seatback portion, a right armrest, and a left armrest. A bottom surface of the seat portion is disposed inside the base. A perimeter of the seat portion substantially conforms to the base. The sled, the base, and the chair are optionally plastic. A pair of elongated elliptical apertures includes a right aperture and a left aperture. The right aperture is disposed through the right area of the sled along the outer rim, and the left aperture is disposed through the left area of the sled along the outer rim. The right aperture is collinearly disposed at a substantially 180 degree angle to the left aperture. Each of the right aperture and the left aperture is configured to removably fit each of a user's right hand fingers and a user's left hand fingers, respectively, such that the user can hold on to the outer rim of the sled while seated in the chair.

The saucer sled with a seat optionally includes a pair of inverted U-shaped tubular handlebars and a top cover. The pair of handlebars includes a right handlebar and a left handlebar. Each of the right handlebar and the left handlebar has a front end, a back end, and a top section. The front end of the right handlebar is removably disposed atop the interior surface of the sled between the front area and the right area, and the front end of the left handlebar is removably disposed atop the interior surface of the sled between the front area and the left area. The back end of the right handlebar is removably disposed atop the interior surface of the sled between the back area and the right area adjacent to the right side of the base proximal the rear surface, and the back end of the left handlebar is removably disposed atop the interior surface of the sled between the back area and the left area adjacent to the left side of the base proximal the rear surface. The front end of the right handlebar is collinearly disposed with the front end of the left handlebar. The back end of the right handlebar is collinearly disposed with the back end of the left handlebar. The top cover is continuously disposed from the top section of the right handlebar to the top section of the left handlebar. A length of the top section of each of the pair of handlebars substantially conforms to approximately two-thirds of a length of the top cover. The top cover is optionally nylon netting and, alternately, plastic. Unlike other sleds, the pair of handlebars and the top cover provide an additional optional safety feature for the user of the sled by protecting the user if the sled were to roll or crash.

Thus has been broadly outlined the more important features of the present saucer sled with a seat so that the detailed description thereof that follows may be better understood and in order that the present contribution to the art may be better appreciated.

BRIEF DESCRIPTION OF THE DRAWINGS

Figures

FIG. 3 is a front elevation view.
FIG. 4 is a cross-sectional view taken along line 4-4 of FIG. 1.
FIG. 6 is an in use view.

DETAILED DESCRIPTION OF THE DRAWINGS

Figure 1:
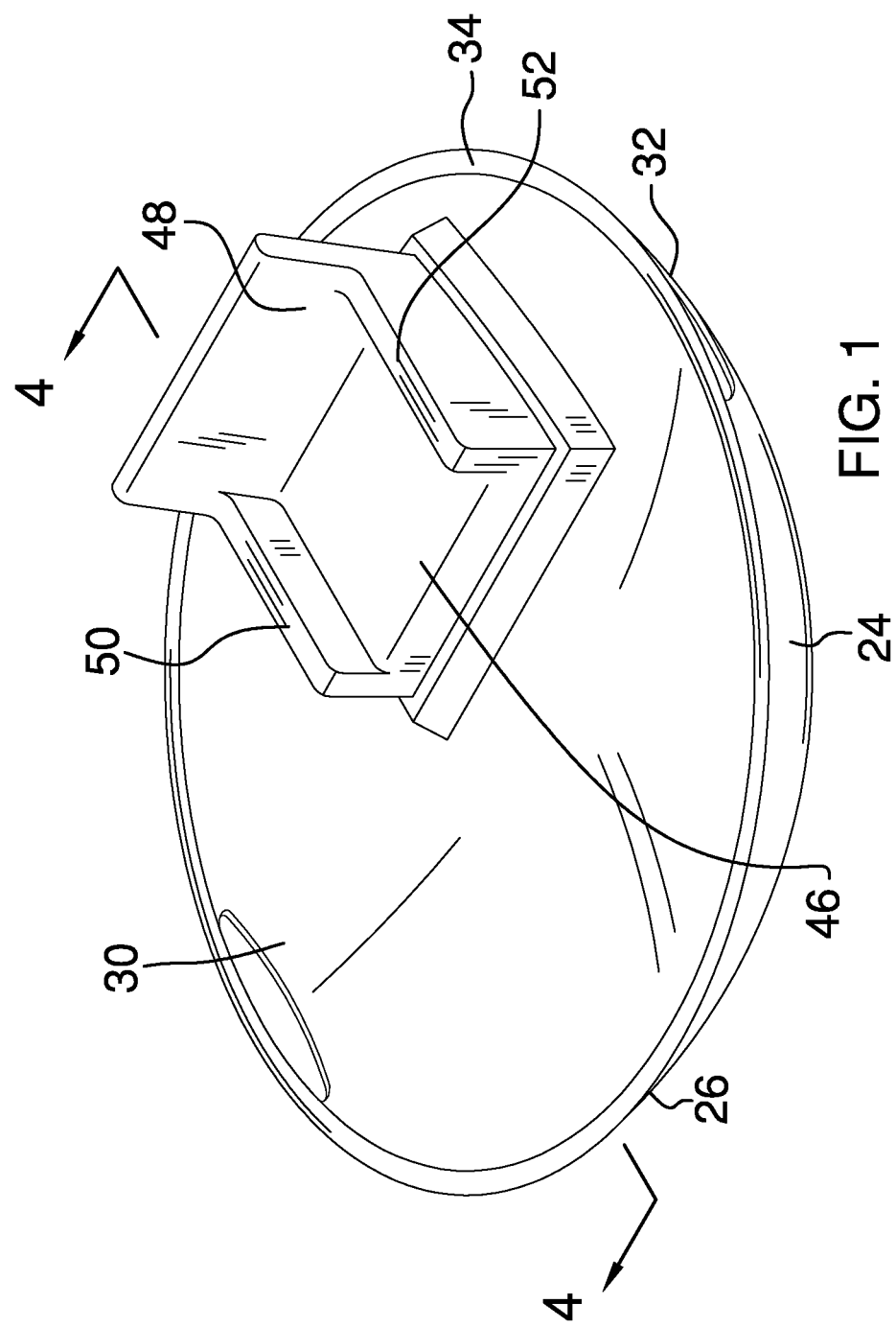
FIG. 1 is a front isometric view.
Figure 2:
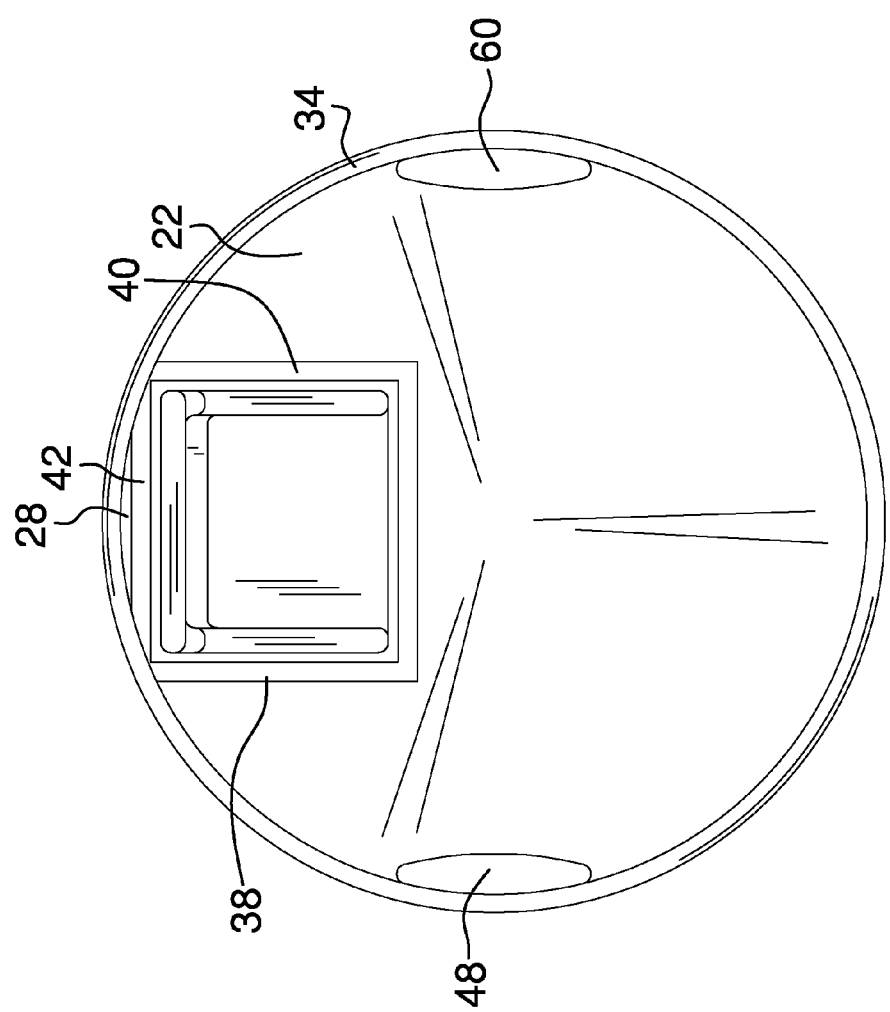
FIG. 2 is a top plan view.
Figure 5:
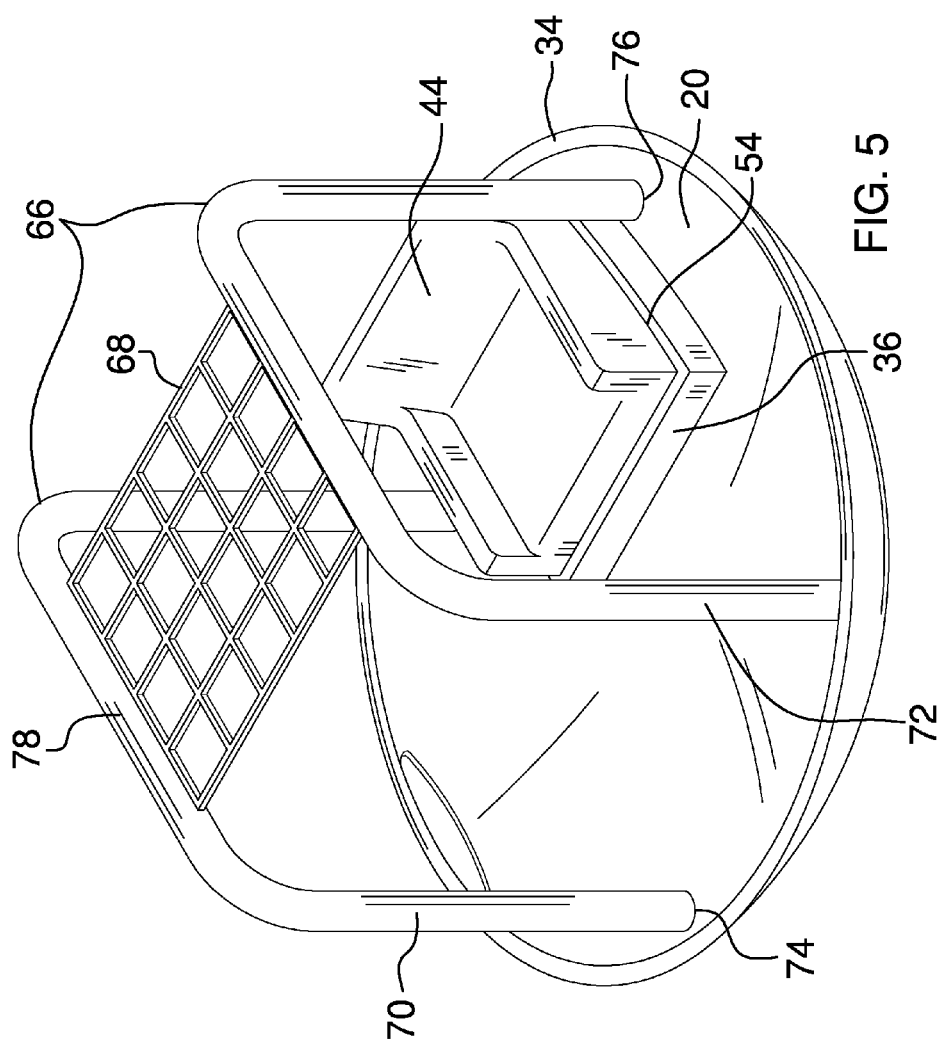
FIG. 5 is a front isometric view showing a pair of handlebars and a top cover.

With reference now to the drawings, and in particular FIGS. 1 through 6 thereof, an example of the instant saucer sled with a seat employing the principles and concepts of the present saucer sled with a seat and generally designated by the reference number 10 will be described.

Referring to FIGS. 1 through 6 the present saucer sled with a seat 10 is illustrated. The saucer sled with a seat 10 includes a concave saucer-shaped sled 20 having an interior surface 22, an exterior surface 24, a front area 26, a back area 28, a right area 30, a left area 32, and a continuous rounded outer rim 34. A trapezoidal base 36 is medially disposed on the interior surface 22 of the sled 20 proximal the back area 28. The base 36 has a right side 38, a left side 40, and a rear surface 42. A chair 44 has a seat portion 46, a seatback portion 48, a right armrest 50, and a left armrest 52. A bottom surface 54 of the seat portion 46 is disposed inside the base 36. A pair of elongated elliptical apertures 56 includes a right aperture 58 and a left aperture 60. The right aperture 58 is disposed through the right area 30 of the sled 20 along the outer rim 34, and the left aperture 60 is disposed through the left area 32 of the sled 20 along the outer rim 34. As best shown in FIG. 6, each of the right aperture 58 and the left aperture 60 is configured to removably fit each of a user's right hand fingers 62 and a user's left hand fingers 64, respectively, such that the user can hold on to the outer rim 34 of the sled 20 while seated in the chair 44.

The saucer sled with a seat 10 optionally includes a pair of inverted U-shaped tubular handlebars 66 and a top cover 68. The pair of handlebars 66 includes a right handlebar 70 and a left handlebar 72. Each of the right handlebar 70 and the left handlebar 72 has a front end 74, a back end 76, and a top section 78. The front end 74 of the right handlebar 70 is removably disposed atop the interior surface 22 of the sled 20 between the front area 26 and the right area 30, and the front end 74 of the left handlebar 72 is removably disposed atop the interior surface 22 of the sled 20 between the front area 26 and the left area 32. The back end 76 of the right handlebar 70 is removably disposed atop the interior surface 22 of the sled 20 between the back area 28 and the right area 30 adjacent to the right side 38 of the base 36 proximal the rear surface 42, and the back end 76 of the left handlebar 72 is removably disposed atop the interior surface 22 of the sled 20 between the back area 28 and the left area 32 adjacent to the left side 40 of the base 36 proximal the rear surface 42. The front end 74 of the right handlebar 70 is collinearly disposed with the front end 74 of the left handlebar 72. The back end 76 of the right handlebar 70 is collinearly disposed with the back end 76 of the left handlebar 72. The top cover 68 is continuously disposed from the top section 78 of the right handlebar 70 to the top section 78 of the left handlebar 72. The top cover is optionally nylon netting and, alternately, plastic.

What is claimed is:

1. A saucer sled with a seat comprising:
   a concave saucer-shaped sled having an interior surface, an exterior surface, a front area, a back area, a right area, a left area, and a continuous rounded outer rim;
   a trapezoidal base medially disposed on the sled interior surface proximal the back area, the base having a right side, a left side, and a rear surface;
   a chair having a seat portion, a seatback portion, a right armrest, and a left armrest, wherein a bottom surface of the seat portion is disposed inside the base;
   wherein a perimeter of the seat portion substantially conforms to the base; and
   a pair of elongated elliptical apertures comprising a right aperture and a left aperture, wherein the right aperture is disposed through the sled right area along the outer rim, and the left aperture is disposed through the sled left area along the outer rim, wherein the right aperture is collinearly disposed at a substantially 180 degree angle to the left aperture;
   wherein each of the right aperture and the left aperture is configured to removably fit each of a user's right hand fingers and a user's left hand fingers, respectively, such that the user can hold on to the sled outer rim while seated in the chair.

2. The saucer sled with a seat of claim 1 further comprising:
   a pair of inverted U-shaped tubular handlebars comprising a right handlebar and a left handlebar, each of the right handlebar and the left handlebar having a front end, a back end, and a top section, wherein the front end of the right handlebar is removably disposed atop the sled interior surface between the front area and the right area, and the front end of the left handlebar is removably disposed atop the sled interior surface between the front area and the left area, wherein the back end of the right handlebar is removably disposed atop the sled interior surface between the back area and the right area adjacent to the base right side proximal the rear surface, and the back end of the left handlebar is removably disposed atop the sled interior surface between the back area and the left area adjacent to the base left side proximal the rear surface;
   wherein the front end of the right handlebar is collinearly disposed with the front end of the left handlebar;
   wherein the back end of the right handlebar is collinearly disposed with the back end of the left handlebar; and
   a top cover continuously disposed from the top section of the right handlebar to the top section of the left handlebar;
   wherein a length of the top section of each of the pair of handlebars substantially conforms to approximately two-thirds of a length of the top cover.

3. The saucer sled with a seat of claim 2 wherein the top cover is nylon netting.

4. The saucer sled with a seat of claim 2 wherein the top cover is plastic.

5. The saucer sled with a seat of claim 4 wherein the sled, the base, and the chair are plastic.

* * * * *